United States Patent
Kakigi

(10) Patent No.: US 7,861,282 B2
(45) Date of Patent: Dec. 28, 2010

(54) INFORMATION PROCESSING APPARATUS, PRINTING APPARATUS AND PRINTING SYSTEM INCLUDING THEREOF APPARATUSES

(75) Inventor: Nobuyoshi Kakigi, Yokohama (JP)

(73) Assignee: Canon Kabushiki Kaisha (JP)

( * ) Notice: Subject to any disclaimer, the term of this patent is extended or adjusted under 35 U.S.C. 154(b) by 741 days.

(21) Appl. No.: 11/782,871

(22) Filed: Jul. 25, 2007

(65) Prior Publication Data
US 2008/0034403 A1 Feb. 7, 2008

(30) Foreign Application Priority Data
Aug. 3, 2006 (JP) .............................. 2006-212240

(51) Int. Cl.
*H04L 9/00* (2006.01)
*H04L 9/32* (2006.01)

(52) U.S. Cl. .............................................. 726/1; 726/2

(58) Field of Classification Search .................. 726/1, 726/2–4, 6–7, 16–17, 20–21; 713/168, 192–194; 380/55
See application file for complete search history.

(56) References Cited

U.S. PATENT DOCUMENTS 7,180,621 B2 * 2/2007 Clough et al. .............. 358/1.15

2004/0125402 A1 * 7/2004 Kanai et al. ................. 358/1.15

FOREIGN PATENT DOCUMENTS

| JP | 2002-63008 A | 2/2002 |
| JP | 2004-289302 A | 10/2004 |

* cited by examiner

*Primary Examiner*—Hosuk Song
(74) *Attorney, Agent, or Firm*—Rossi, Kimms & McDowell LLP

(57) ABSTRACT

Provided is a printing system in which the latest policy information is reflected at all times and document-by-document policy information is checked. To accomplish this, the printing system includes an information processing apparatus adapted to output print data, a policy server adapted to manage policy information and at least one printing apparatus. The information processing apparatus outputs print data to which an identification information has been appended. The printing apparatus acquires print data via an information communication medium, accesses the policy server based upon access information and acquires policy information by transmitting authentication information and an identification information to the policy server. Further, in accordance with the acquired policy information, the printing apparatus determines whether or not to execute printing. The policy server issues the policy information based upon authentication information and identification information.

19 Claims, 13 Drawing Sheets ism, a second acquisition unit adapted to acquire policy information, which defines at least a printing restriction among restrictions on functions relating to the print data, by accessing a policy server, which manages the policy information, based upon
INFORMATION PROCESSING APPARATUS, PRINTING APPARATUS AND PRINTING SYSTEM INCLUDING THEREOF APPARATUSES

BACKGROUND OF THE INVENTION

1. Field of the Invention

The present invention relates to a printing system. More particularly, the invention relates to a technique for enhancing security by application of a security policy.

2. Description of the Related Art

The spread of personal computers and an increase in speed thereof in recent years have been accompanied by the acceleration of digitization of information in office operations. Under these circumstances, the management of electronic documents such as confidential documents is becoming increasingly important. A printing system of growing popularity as a system for implementing the management of electronic documents is one that applies a prescribed security policy to electronic documents flooding offices, thereby controlling access and functions and enhancing security.

An example of such a printing system is one in which a computer application sets policy information on a user-by-user basis. The application registers, edits and creates a security policy per document in response to an indication from the user. The set policy information includes information as to whether a document is permitted to be referred to, edited or printed, as well as the term of validity of this information. The policy information is stored in a server (a policy server) that manages policy, and it is possible to refer to the policy information by logging in to the server. That is, an application running on a personal computer logs in to the policy server, acquires the policy information and operates in accordance with the policy information. For example, a user for which the setting does not permit reference cannot refer to the relevant document, an a user for which the setting does not permit printing cannot print the document.

The specification of Japanese Patent Application Laid-Open No. 2002-63008 proposes a system in which whether utilization of a printing apparatus is restricted is determined upon connecting a terminal device to a server that stores a list of users for which access is restricted.

Further, the specification of Japanese Patent Application Laid-Open No. 2004-289302 proposes a printing system in which whether utilization is restricted is determined upon accessing a user database that contains access privilege per user of various functions possessed by an MFP (multifunction peripheral).

These conventional techniques, however, involve the following problems: For example, in a system in which a specific host application performs a policy check, there is the danger that a route that does not have the host application as an intermediary will arise. Examples are a case where application data is transmitted directly to a printing apparatus by ftp, and a case where a removable medium such as a USB memory is connected to a printing apparatus and the application data on the medium is printed (this represents direct printing from a medium).

Furthermore, with the foregoing systems, there is the danger that printing that reflects the latest policy information cannot be performed. With the foregoing systems, policy information is verified by the host application. If printing is possible, the print data is transmitted to the printing apparatus. There is the danger that after the print data has been transmitted, the policy will change during the time that the data is stored within the printing apparatus as a saved job awaiting printing. Further, there is the danger that the policy will change while printing is being suspended owing to paper jam of the transmitted document or because of an out-of-paper error. In such cases, the foregoing printing systems are such that when a saved or suspended job is resumed, printing that does not reflect the latest policy is executed as is.

Further, in the printing systems described in Japanese Patent Application Laid-Open Nos. 2002-63008 and 2004-289302 in which a device such as a printer or MFP applies the policy, the only restriction is utilization of the device and functions on a per-user basis, and it is difficult to restrict scope of utilization on a per-document basis. From the standpoint of security, it is more preferred that restriction of utilization on a per-document basis be adopted in an actual office.

SUMMARY OF THE INVENTION

The present invention enables realization of a printing system in which the latest policy information is reflected at all times and document-by-document policy information is checked.

One aspect of the present invention provides a printing system comprising an information processing apparatus adapted to output print data, a policy server adapted to manage policy information that defines at least a printing restriction among restrictions on functions relating to the print data, and a printing apparatus. The information processing apparatus includes an output unit adapted to output the print data, the print data having an appended identification information necessary in order to identify the print data. The printing apparatus includes a first acquisition unit adapted to acquire the print data via an information communication medium, a second acquisition unit adapted to acquire the policy information by accessing the policy server based upon access information for accessing the policy server, and transmitting authentication information, which is for authenticating the user of the print data, and the identification information to the policy server; and a first determination unit adapted to determine whether or not to execute printing in accordance with the acquired policy information. The policy server includes an issuing unit adapted to issue the policy information based upon the authentication information and the identification information.

Another aspect of the present invention provides an information processing apparatus comprising an authentication information input unit adapted to input authentication information for authenticating a user of print data, a second determination unit adapted to determine whether or not identification information has been appended to the print data, the identification information being necessary in order to identify the print data, and a transmitting unit which, in a case where the identification information has been appended, is adapted to transmit the authentication information and access information to a printing apparatus together with the print data, the access information being for accessing a policy server that manages policy information defining at least a printing restriction among restrictions on functions relating to the print data.

Still another aspect of the present invention provides a printing apparatus comprising a first acquisition unit adapted to acquire print data via an information communication medium, the print data having an appended identification information necessary in order to identify print data, a second acquisition unit adapted to acquire policy information, which defines at least a printing restriction among restrictions on functions relating to the print data, by accessing a policy server, which manages the policy information, based upon access information for accessing the policy server, and transmitting authentication information, which is for authenticating the user of the print data, and the identification information to the policy server, and a first determination unit adapted to determine whether or not to execute printing in accordance with the acquired policy information.

Yet another aspect of the present invention provides a method of controlling an information processing apparatus comprising the steps of inputting authentication information for authenticating a user of print data, determining whether or not identification information has been appended to the print data, the identification information being necessary in order to identify the print data, and in a case where the identification information has been appended, transmitting the authentication information and access information to a printing apparatus together with the print data, the access information being for accessing a policy server that manages policy information defining at least a printing restriction among restrictions on functions relating to the print data.

Still yet another aspect of the present invention provides a method of controlling a printing apparatus comprising steps of acquiring print data via an information communication medium, the print data having an appended identification information necessary in order to identify print data, acquiring policy information, which defines at least a printing restriction among restrictions on functions relating to the print data, by accessing a policy server, which manages the policy information, based upon access information for accessing the policy server, and transmitting authentication information, which is for authenticating the user of the print data, and the identification information to the policy server, and determining whether or not to execute printing in accordance with the acquired policy information.

Yet still another aspect of the present invention provides a computer program for causing a computer to execute a method of controlling an information processing apparatus, comprising the steps of inputting authentication information for authenticating a user of print data, determining whether or not identification information has been appended to the print data, the identification information being necessary in order to identify the print data, and in a case where the identification information has been appended, transmitting the authentication information and access information to a printing apparatus together with the print data, the access information being for accessing a policy server that manages policy information defining at least a printing restriction among restrictions on functions relating to the print data.

Still yet another aspect of the present invention provides a computer program for causing a computer to execute a method of controlling a printing apparatus, comprising the steps of acquiring print data via an information communication medium, the print data having an appended identification information necessary in order to identify print data, acquiring policy information, which defines at least a printing restriction among restrictions on functions relating to the print data, by accessing a policy server, which manages the policy information, based upon access information for accessing the policy server, and transmitting authentication information, which is for authenticating the user of the print data, and the identification information to the policy server, and determining whether or not to execute printing in accordance with the acquired policy information.

Further features of the present invention will become apparent from the following description of exemplary embodiments with reference to the attached drawings.

DESCRIPTION OF THE EMBODIMENTS

Preferred embodiments of the present invention will now described in detail with reference to the drawings. It should be noted that the relative arrangement of the components, the numerical expressions and numerical values set forth in these embodiments do not limit the scope of the present invention unless it is specifically stated otherwise.

Figure 1A:
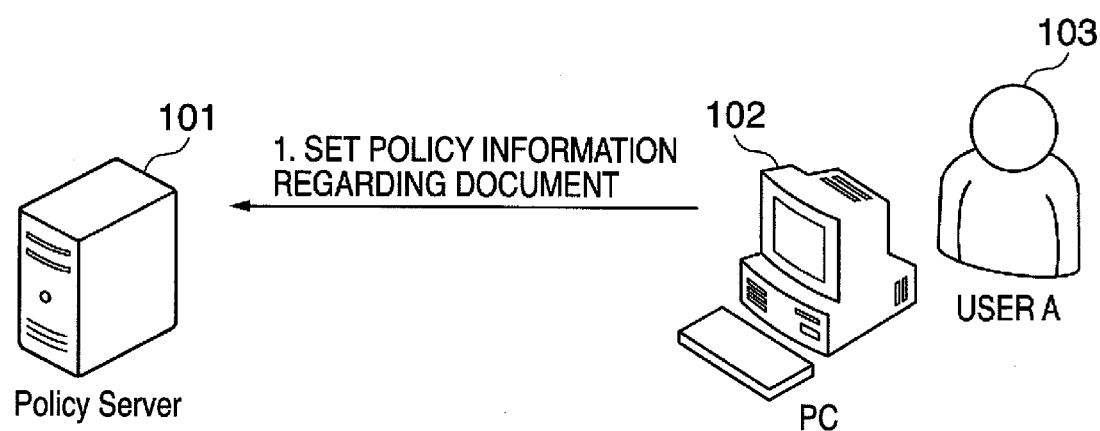
FIGS. 1A and 1B are diagrams illustrating an overview of a printing system according to the prior art.
Figure 1B:
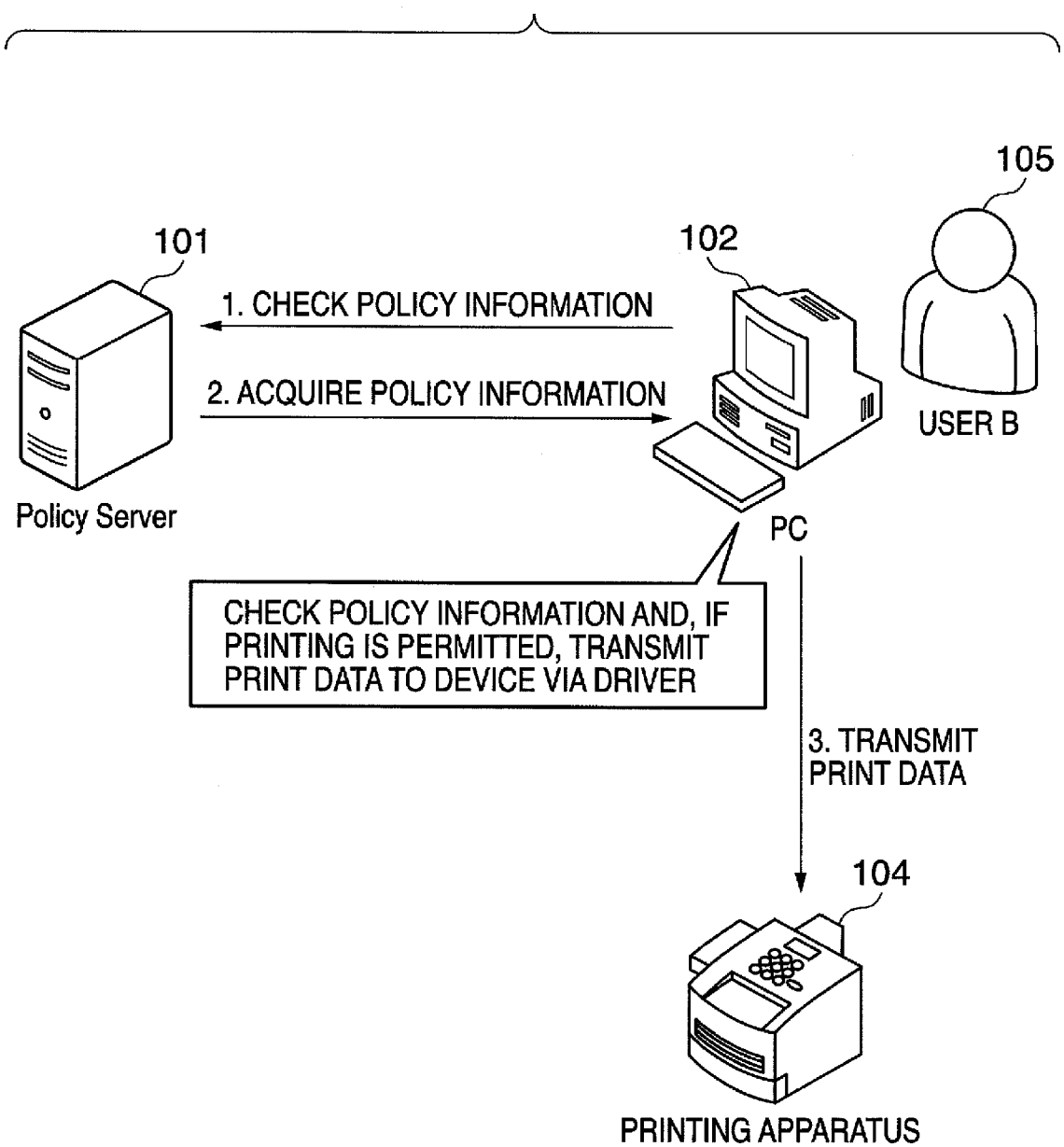

First, reference will be had to FIGS. 1A and 1B to describe a printing system according to the prior art. FIGS. 1A and 1B are diagrams illustrating an overview of the conventional system. As illustrated in FIGS. 1A and 1B, the system comprises a policy server 101, an information processing apparatus (e.g., a personal computer) 102 and a printing apparatus 104. The policy server 101 manages security policy information (referred to simply as "policy information" below) such as the right to access and operate on documents (document data and document files), e.g., whether to permit or restrict printing, etc. The information processing apparatus 102 creates documents and the like and sets the policy information in the policy server 101. Further, when printing is performed, the information processing apparatus 102 queries the policy server 101 with regard to policy information and, if printing is possible, outputs a document that is to be printed to the printing apparatus 104. The printing apparatus 104 receives and prints documents, etc., output from the information processing apparatus 102. The specific procedure up to execution of printing will be described below.

First, as illustrated in FIG. 1A, the setting of security policy information is performed when a document is created. By way of example, the policy information set includes information, set forth below, relating to restrictions on operations. A user A 103 is capable of executing document reference, editing and printing, and the limit on execution is 45 days for this user. A user B 105 is capable of document reference only and the limitation on reference is 30 days for this user. This policy information is stored in the policy server 101. By logging in to the policy server 101, policy information can be created anew, edited and consulted.

Next, a case where the user B 105 prints a document created by the user A 103 will be described with reference to FIG. 1B. First, the application running on the information processing apparatus 102 logs in to the policy server 101 and acquires the policy information concerning this document. Upon checking the operating privileges of this user, the information processing apparatus 102 controls whether various processing is permitted or not. That is, a user for which non-permission to print has been set cannot print the document. Further, a user for which non-permission to refer has been set cannot refer to the document. On the other hand, if printing has been permitted, the information processing apparatus 102 transmits the document to the printing apparatus 104 and the printing apparatus 104 executes printing.

First Embodiment

Figure 2:
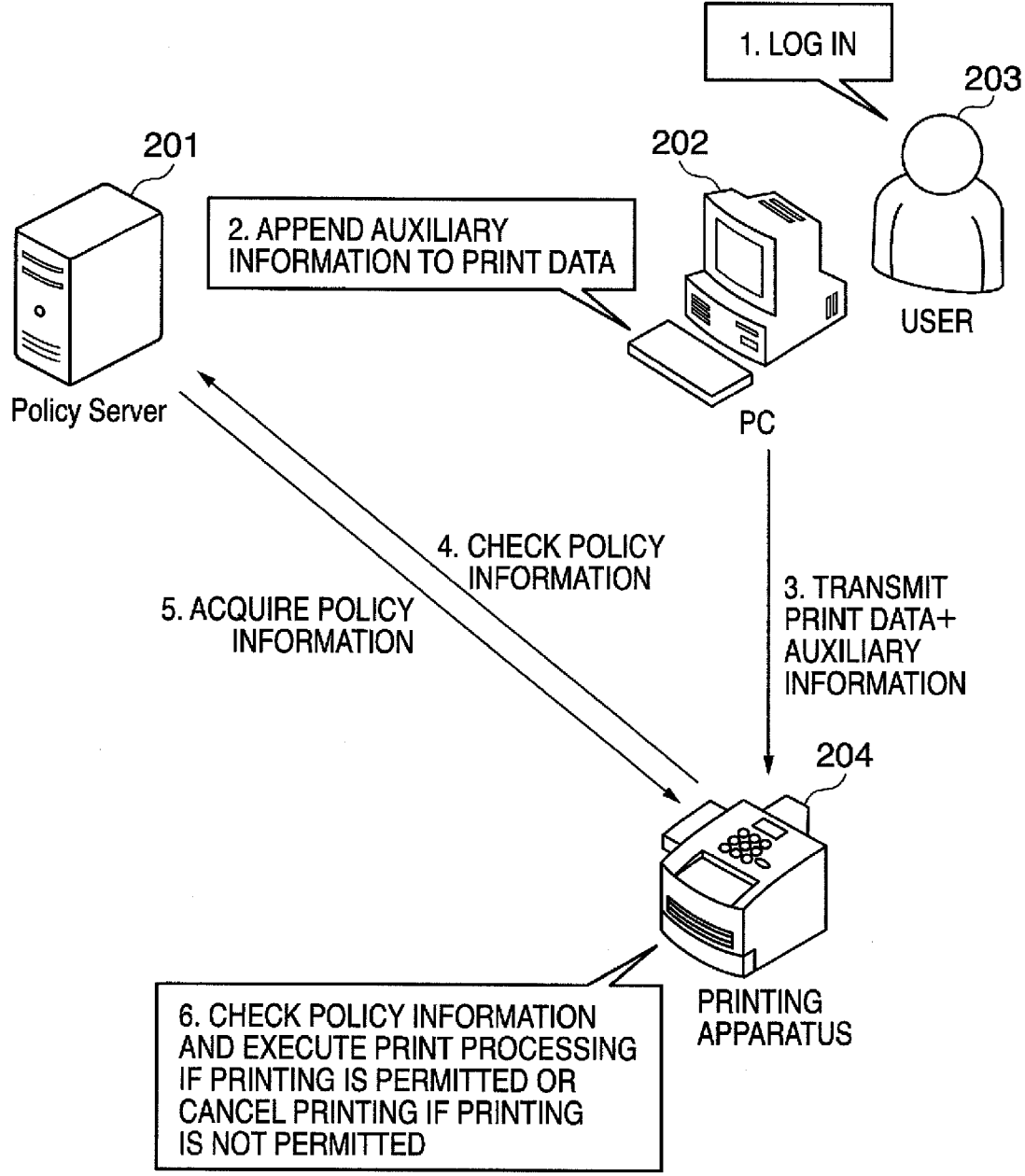
FIG. 2 is a diagram useful in describing an overview of a printing system corresponding to a first embodiment of the present invention.

Reference will be had to FIGS. 2 to 6 to describe a first embodiment of the present invention. FIG. 2 is a diagram useful in describing an overview of a printing system corresponding to the first embodiment.

The printing system according to this embodiment comprises a policy server 201, an information processing apparatus 202 and a printing apparatus 204. The policy server 201 manages policy information, which defines at least a restriction on printing among restrictions on functions concerning a document, in relation to identification information (ID) for identifying the document and authentication information, which is information that specifies the user. Further, it may be so arranged that the policy information defines restrictions on functions, such as a restriction on reference to the document, and a restriction on functions included in the printing apparatus, e.g., a restriction on color printing. That is, a restriction on functions signifies the content of an operation (printing, reference, writing, etc.) applied to the document and the right to perform each operation (to permit color printing, etc.) The information processing apparatus 202 creates documents and the like and sets policy information in the policy server 201. The policy server 201 according to this embodiment appends an ID, which is necessary in order to identify the document, to document data. The ID is an identifier uniquely assigned on a per-document basis and may be an 8-digit identification number, by way of example. The policy server 201 correlates and manages the ID and policy information. Further, the policy server includes an issuing unit for issuing policy information based upon the ID. Accordingly, by appending and ID to a document, it is possible for the right to operate on the document to be managed by the policy server. At the time of printing, the information processing apparatus 202 outputs document data (print data) that is to be printed to the printing apparatus 204. In relation to the print data, the printing apparatus 204 sends the policy server 201 the ID of the document data and queries the policy server 201 regarding policy information. If the response is that the received print data is capable of being printed, then the printing apparatus 204 executes printing.

Thus, unlike the printing system according to the prior art, the printing system according to the present invention is such that policy information is checked by the printing apparatus 204. Further, the present printing system is such that verification of policy information is performed for every document to be printed. The details of the procedure up to execution of printing will be described below. It should be noted that registration of policy information concerning a document is carried out through a procedure similar to that shown in FIG. 1A.

First, as illustrated in FIG. 2, the user 203 operates the information processing apparatus 202 and logs in to the printing system. When the user 203 logs in, authentication information (user name and password) is input and the user is specified. The user 203 selects print data desired to be printed. A print application that designates printing outputs the authentication information together with the selected print data. Here the print data is document data to be printed. The data indicates application data such as a PDF document or PDL data described in PDL. Alternatively, the data may well be image data such as JPEG or TIFF image data. Further, it may be so arranged that the print application transmits access information (e.g., the IP address of the policy server 201, etc.) for accessing the policy server 201.

As mentioned above, the information processing apparatus 202 transmits print data to the printing apparatus 204 in accordance with a print command from the user but does not execute a policy check. In a case where the information processing apparatus 202 prints document data at the printing apparatus 204 in the example of FIG. 2, it does not employ a printer driver used in ordinary print processing. Processing actually executed by the print application is processing whereby document data to be printed is transmitted to the printing apparatus 204. The print application therefore does not recognize this processing as print processing. Accordingly, at the stage where a print command has been received, the information processing apparatus 202 queries the policy server 201 with regard to policy information and does not determine whether printing is possible or not. In accordance with this embodiment, therefore, the policy check is performed on the side of the printing apparatus 204. Accordingly, the information processing apparatus 202 transmits the authentication information and access information along with the print data to the printing apparatus 204 in order that the policy check can be performed on the side of the printing apparatus 204. Further, in order to lighten the processing load on the printing apparatus 204, it may be so arranged that the information processing apparatus 202 extracts the ID from the print data and appends and transmits the ID.

In order to select document data to be printed and transmit the data to the printing apparatus 204, it may be so arranged that the operating system of the information processing apparatus 202 executes this processing without using a print application.

Thus, the printing system according to this embodiment is capable of performing a policy check on the side of the printing apparatus 204 just prior to the execution of printing. This makes it possible to reflect policy information in real time in print data for which printing has been requested. That is, even in a case where policy information has been changed, the printing apparatus acquires the policy information from the policy server immediately before printing. This is advantageous in that the latest policy information can be reflected in the print data to be printed.

The printing apparatus 204 receives the authentication information and access information along with the print data from the information processing apparatus 202. The printing apparatus accesses the policy server 201 based upon the received access information and sends the policy server 201 the authentication information for authenticating the user of the print data, as well as the ID.

The policy server 201 specifies the user from the received authentication information and issues policy information that has been correlated with the received ID. On the basis of the policy information acquired, the printing apparatus 204 determines whether the print data is capable of being printed. Print permission information, which indicates whether printing is possible or not, has been appended to the policy information issued by the policy server 201. For example, logical "0" (printing permitted) or logical "1" (printing not permitted) is set in the print permission information. As a result, the printing apparatus 204 acquires the print permission information and discriminates the logical value that has been set, thereby determining whether printing is permitted or not. Next, the printing apparatus 204 executes printing if printing is possible or cancels the print job relating to the print data if printing is not possible.

The printing apparatus 204 according to the present invention may be in the form of an MFP or may have at least a printing function such as that of a printer or copier. That is, it will suffice if the printing apparatus is one equipped with a user interface (described later) in addition to a printing function.

Figure 3:
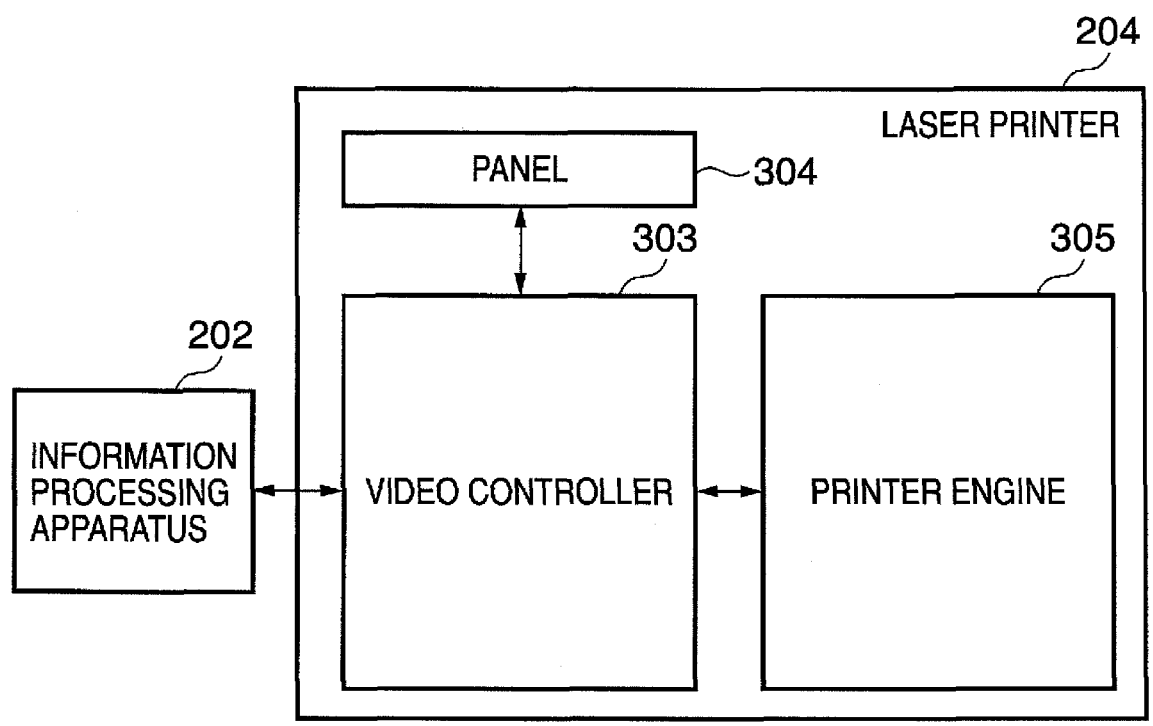
FIG. 3 is a diagram illustrating the system configuration in a printing apparatus corresponding to the first embodiment.

Next, reference will be had to FIG. 3 to describe an example of the configuration of a printing apparatus according to this embodiment. FIG. 3 is a diagram illustrating the system configuration in a printing apparatus corresponding to the first embodiment.

As illustrated in FIG. 3, the information processing apparatus 202 is a computer, for example, and functions as a source that supplies image information or as the controller of a printer. The printing apparatus 204 according to this embodiment will be described using a laser printer as one example of application. However, the printing apparatus 204 to which the present invention is applied is not limited to a laser printer and may be a copier, a facsimile machine or a multifunction peripheral (MFP) having copier and facsimile functions, etc.

The printing apparatus 204 includes a video controller 303, a panel 304 and a printer engine 305. On the basis of image information (e.g., ESC code, page description language, etc.) supplied from the information processing apparatus 202, the video controller 303 generates raster data page by page and sends the raster data to the printer engine 305.

On the basis of the raster data supplied from the video controller 303, the printer engine 305 forms a latent image on a photosensitive drum, transfers the latent image to a print medium and fixes the image (using electrophotography), thereby printing the image. It should be noted that the printer engine 305 may use another printing method, such as the ink-jet method.

The panel 304 is used as a user interface. By operating the panel 304, a user can specify the desired operation. Further, the panel 304 displays the content of processing by the printing apparatus 204 and warning messages to the user. If a power-saving mode is in effect, the display on the panel 304 is extinguished.

Figure 4:
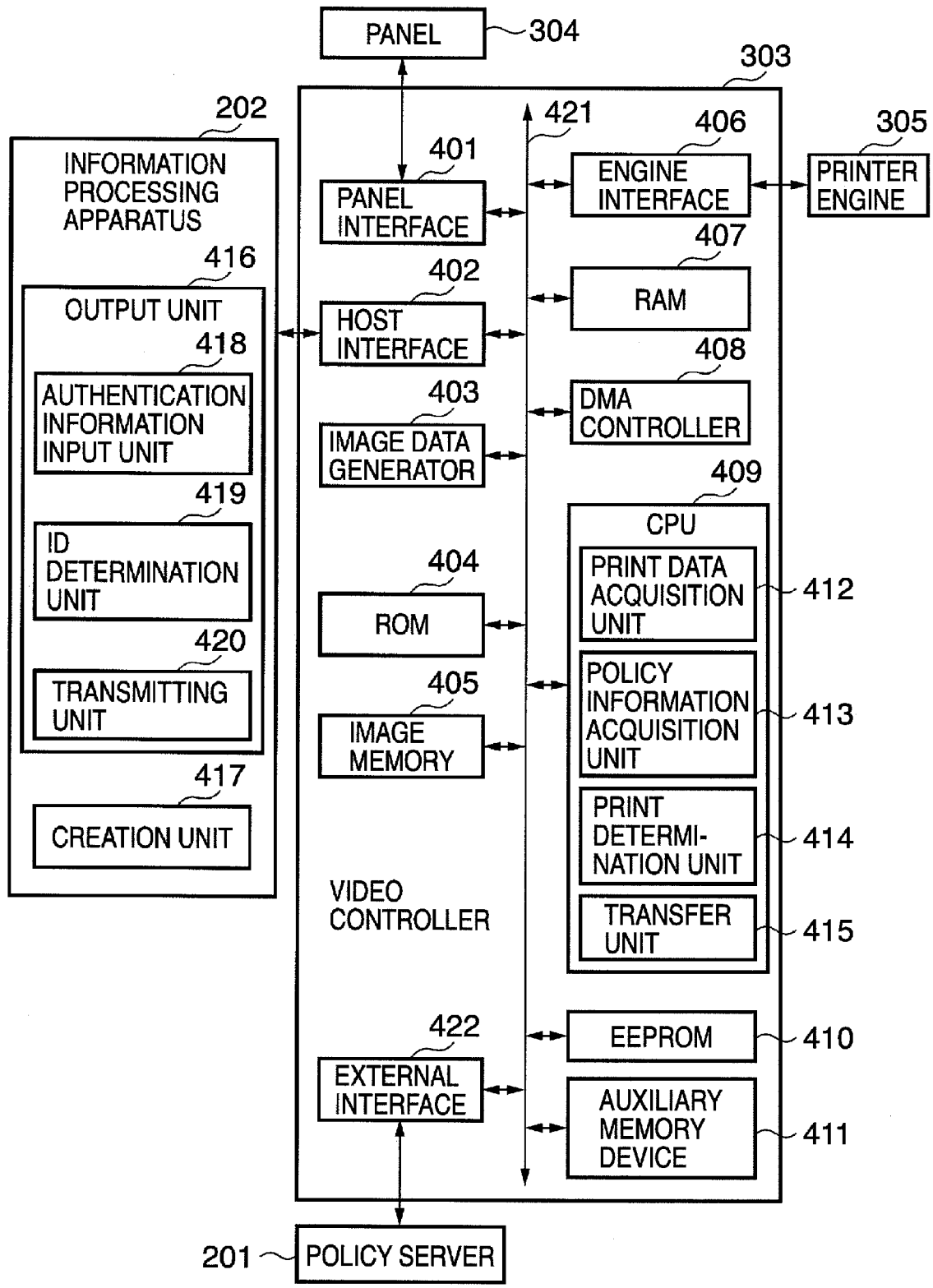
FIG. 4 is a block diagram illustrating the details of an information processing apparatus and printing apparatus corresponding to the first embodiment.

Next, reference will be had to FIG. 4 to describe the details of the information processing apparatus 202 and printing apparatus 204 in this embodiment. FIG. 4 is a block diagram illustrating the details of the system configuration of the information processing apparatus and printing apparatus corresponding to the first embodiment.

As illustrated in FIG. 4, the video controller 303 includes a panel interface 401, a host interface 402, an image data generator 403, a ROM 404 and an image memory 405. The video controller 303 includes an engine interface 406, a RAM 407, a DMA controller 408, a CPU 409, an EEPROM 410, an auxiliary memory device 411 and an external interface 422.

The panel interface 401 performs data communication with the panel 304 and notifies the CPU 409 of content set or specified by the user at the panel 304. Further, the panel interface 401 notifies the panel 304 of instructions to the user reported from the CPU 409. The host interface 402 implements a communication connection bidirectionally with the information processing apparatus 202, such as a host computer, and an information terminal such as a PDA or mobile telephone via a communication network or information communication medium such as an USB. The engine interface 406 is connected to the printer engine 305. The CPU 409 controls signals via the engine interface 406 and is capable of recognizing the status of the printer engine 305 based upon signals received.

The image data generator 403 generates (rasterizes) raster data, which is supplied to the printer engine 305, based upon image information such as PDL supplied from the information processing apparatus 202. The image memory 405 stores the generated raster data temporarily. On the basis of control program code that has been stored in the ROM 404, the CPU 409 controls a device that has been connected to a CPU bus 421. The RAM 407 serves as a temporary storage memory used by the CPU 409 and it is so arranged that memory capacity can be expanded by optional RAM connected to an expansion board (not shown). Further, the RAM 407 is used as a rendering-object storage unit for storing rendering objects, and as a work memory used temporarily by the control program stored in the ROM 404. The EEPROM 410 is constituted by a non-volatile memory for storing control information such as a density correction table, by way of example. The DMA controller 408 transfers raster data within the image memory 405 to the engine interface 406 in response to a command from the CPU 409. The auxiliary memory device 411 is, e.g., a hard disk for saving print data and other control information. Data that has been stored in the auxiliary memory device 411 is read out to the RAM 407, which is the main memory, and is used by the CPU 409. The external interface 422 is connected to the policy server 201 and is used to acquire policy information.

Further, the CPU 409 includes a print data acquisition unit 412, a policy information acquisition unit 413, a print determination unit 414 and a transfer unit 415. The print data acquisition unit 412 acquires print data from the host interface 402 via an information communication medium, e.g., a communication network. The policy information acquisition unit 413 accesses the policy server 201 via the external interface 422 based upon access information. Furthermore, the policy information acquisition unit 413 transmits the ID of the print data and authentication information to the policy server 201 and acquires policy information. In accordance with the acquired policy information, the print determination unit 414 determines whether printing is executed or not. The transfer unit 415 transfers print data, authentication information, access information and ID to another printing apparatus.

The CPU bus 421 transfers signals and includes address, data and control buses. Each component within the video controller 303 of FIG. 4 is capable of accessing all devices connected to the CPU bus 421.

The information processing apparatus 202 includes an output unit 416 and a creation unit 417. The output unit 416 includes an authentication information input unit 418, an ID determination unit 419 and a transmitting unit 420 in order to output print data to the printing apparatus 204 via the information communication medium. The creation unit 417 creates print data to be printed, e.g., PDF data or PDL data. Further, the creation unit 417 accesses the policy server 201, records newly created policy information in the policy server 201 and edits the policy that has been registered in the policy server 201. Further, the creation unit 417 appends to the print data an ID for identifying the document. The ID is a unique value for every document and preferably is issued by the policy server 201 that manages the policy information.

The authentication information input unit 418 acquires authentication information, e.g., a user ID and password, from an input by user. The ID determination unit 419 determines whether an ID has been appended to the print data in response to a print command from the user. In this way it is determined whether the print data is print data that requires a policy check. If an ID has been appended to the print data, the transmitting unit 420 transmits the authentication information and the access information (the IP address, etc., of the policy server 201), which is for accessing the policy server 201, to the printing apparatus 204 along with the print data. Further, with regard to print data to which an ID has not been appended, the transmitting unit 420 transmits only the print data.

It should be noted that it is so arranged that the video controller 303, information processing apparatus 202 and policy server 201 in FIG. 4 are each connected to a network so as to be capable of communicating with one another.

Figure 5:
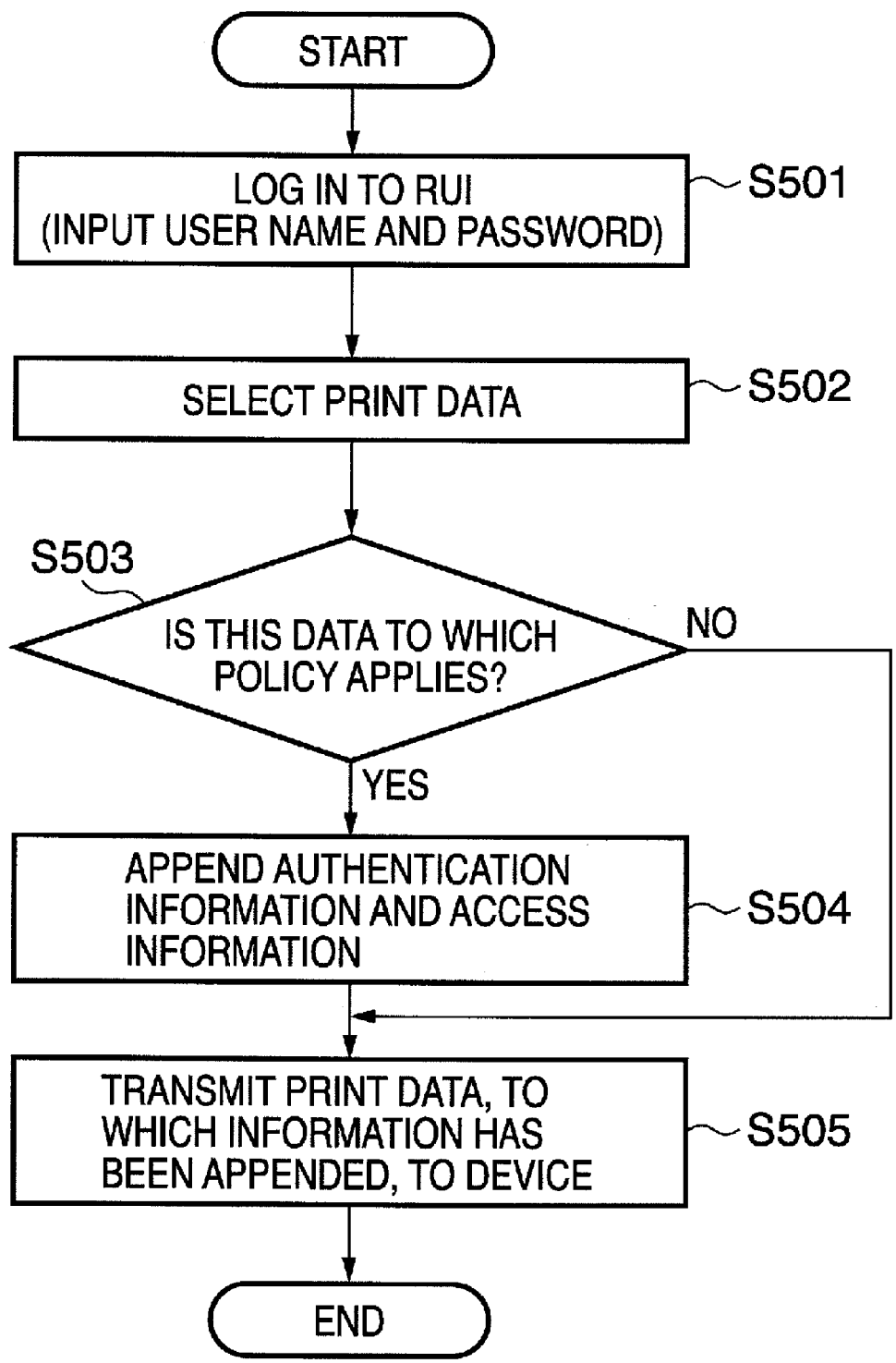
FIG. 5 is a flowchart illustrating processing executed by the information processing apparatus corresponding to the first embodiment.

Next, reference will be had to FIG. 5 to describe the processing executed by the information processing apparatus according to this embodiment. FIG. 5 is a flowchart illustrating processing executed by the information processing apparatus corresponding to the first embodiment.

At step S501 in FIG. 5, the authentication information input unit 418 acquires authentication information, which has been input by the user in order to log in to a remote user interface (RUI), from the panel 304. The RUI is an application that makes it possible to operate the printing apparatus 204 in various ways from the information processing apparatus 202. The RUI changes set values (e.g., number of copies to be printed, number allocated in allocation printing, etc.) in various functions of the printing apparatus 204 and checks the states of print jobs and devices. Further, the RUI instructs execution of a pending print job in an error state (paper jam, etc.) or print-standby state and transmits application data in the information processing apparatus 202.

Next, at step S502, the output unit 416 acquires application data, such as PDF data or PDL data selected by the user, as print data (document data to be printed). Then, at step S503, the ID determination unit 419 determines whether an ID has been appended to the print data, i.e., whether the data is data for which policy has been managed by the policy server. If an ID has been appended, then the output unit 416 appends the authentication information and access information entered at the time of log-in to the print data at step S504. Control then proceeds to step S505. Here the transmitting unit 420 transmits the print data together with the authentication information and access information to the printing apparatus 204. In order to lighten the processing load on the printing apparatus 204, it may be so arranged that the transmitting unit 420 extracts the ID from the print data and transmits the ID together with the print data.

Figure 6:
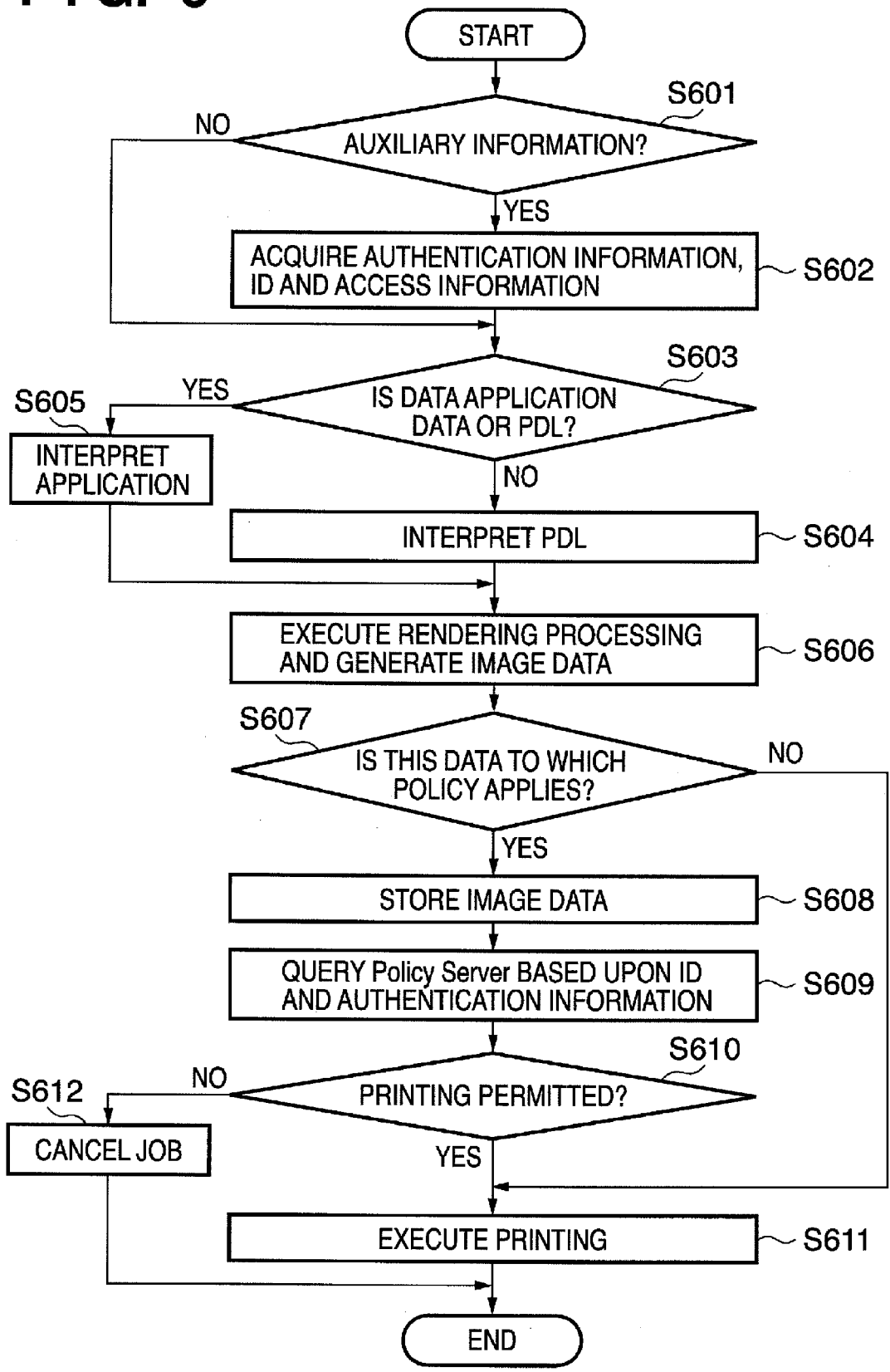
FIG. 6 is a flowchart illustrating processing executed by the printing apparatus corresponding to the first embodiment.

Next, reference will be had to FIG. 6 to describe processing executed by the printing apparatus according to this embodiment. FIG. 6 is a flowchart illustrating processing executed by the printing apparatus corresponding to the first embodiment.

When print data is received, the CPU 409 determines at step S601 whether the auxiliary information such as the authentication information, access information and ID has been acquired together with the print data by the print data acquisition unit 412. If auxiliary information is found, then the CPU 409 extracts the authentication information, access information and ID from this auxiliary information at step S602. Next, the CPU 409 determines whether the received data is application data, such as PDF, or PDL data at step S603. If the data is application data, then the CPU 409 interprets the application data at step S605. If the data is PDL data, on the other hand, then the CPU 409 interprets the PDL at step S604. When the print data is interpreted, the CPU 409 executes rendering processing and generates image data (raster data) at step S606. The policy information acquisition unit 413 manages the image data, which has been generated by rendering processing, in association with the auxiliary information acquired together with the original print data.

At step S607, the CPU 409 determines whether an ID has been appended to the print data. In other words, the CPU 409 determines whether the data is data for which policy has been managed by the policy server 201. If an ID has not been attached, control proceeds to step S611 and printing is executed as is. If an ID has been appended, on the other hand, then the CPU 409 places on hold temporarily the image data for printing generated at step S606 and places execution of printing on hold at step S608. That is, the print job is placed on hold temporarily.

With execution of printing having been placed on hold, the CPU 409 accesses the policy server 201 by the policy information acquisition unit 413 based upon the access information at step S609. The policy information acquisition unit 413 transmits the authentication information and ID, which are included in the auxiliary information correlated with the generated image data, to the policy server 201 and acquires policy information. At step S610, the CPU 409 determines by the print determination unit 414 whether the user who issued the print command is permitted to print the present print job. If printing is permitted, control proceeds to step S611 and the CPU 409 executes the printing of the saved image data.

If printing is not permitted, then the CPU 409 cancels the print job at step S612. If the print job is cancelled, the CPU 409 discards image data and executes job cancellation for suspending printing. It may be so arranged that the CPU 409 allows the user to input command information for instructing how to handle print data at execution of job cancellation and processes the print data in accordance with the input command information. Here the command information includes job cancellation for suspending processing and allocation printing for allocating pages or title printing for printing a title only. Accordingly, it is preferred that the printing apparatus 204 include a third acquisition unit which, in a case where the print determination unit 414 has determined that printing is not permitted, acquires command information for instructing how to handle print data, and a processing unit for processing print data in accordance with the command information. Further, it may be so arranged that the third acquisition unit issues the information processing apparatus 202 a request to query the user and acquire the command information that has been input by the user. Further, it may be so arranged that the printing apparatus 204 stores the command information in the ROM 404 beforehand. In this case, it is desired that the third acquisition unit acquire the command information from the ROM 404 and notify the user of the acquired command information via the information processing apparatus 202.

Thus, as described above, the printing system according to this embodiment includes an information processing apparatus, printing apparatus and policy server. Further, upon being notified of print data, the printing apparatus check policy information relating to the document. As a result, the present printing system is capable of checking policy information on a per-document basis by the printing apparatus immediately before printing is executed. Accordingly, with respect to print data for which printing has been requested, the present printing system reflects the latest policy information at all times and is capable of applying a restriction on functions, e.g., a restriction on printing, on a per-document basis.

The present invention is not limited to the above-described embodiment and can be modified in various ways. The information processing apparatus may be adapted so as to transmit authentication information and access information together with print data. Further, the printing apparatus may be adapted so as to log in to the policy server based upon transmitted access information, transmit authentication information and ID to the policy server and acquire policy information. As a result, since the printing apparatus is notified of the authentication information and access information, the present printing system is capable of lightening the processing load on the printing apparatus and makes highly efficient printing possible.

Second Embodiment

Figure 7:
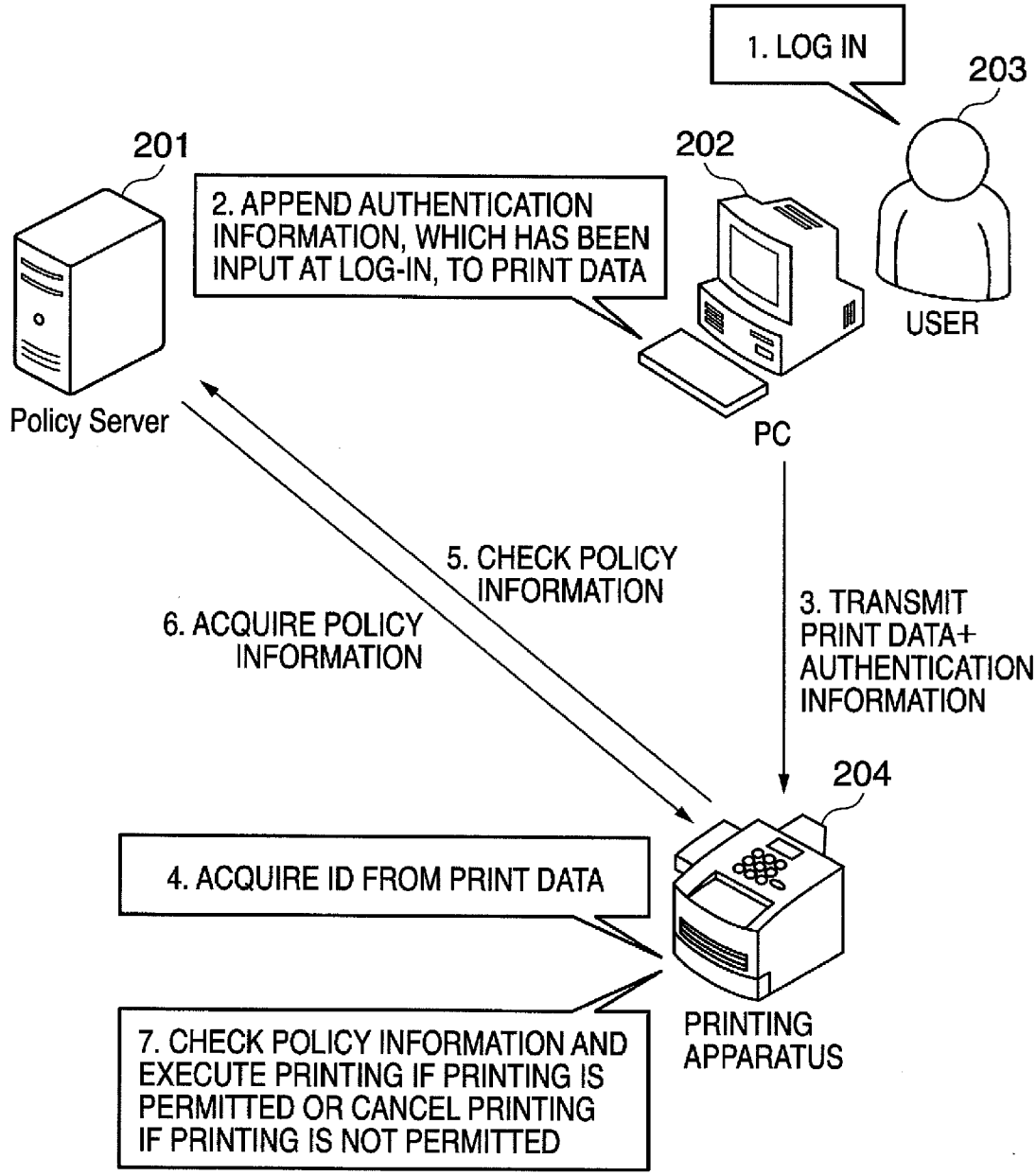
FIG. 7 is a diagram useful in describing an overview of a printing system corresponding to a second embodiment of the present invention.

Next, a second embodiment will be described with reference to FIG. 7. In accordance with the second embodiment, the information processing apparatus 202 transmits authentication information to the printing apparatus 204 along with print data. That is, unlike the first embodiment, the information processing apparatus 202 does not transmit access information. FIG. 7 is a diagram useful in describing an overview of a printing system corresponding to the second embodiment. Components and processing steps similar to those of the first embodiment need not be described again.

As illustrated in FIG. 7, the printing system according to the second embodiment includes the policy server 201, the information processing apparatus 202 and the printing apparatus 204 in a manner similar to the first embodiment. Operation at the time of printing in the present printing system will be described. First, the user 203 inputs authentication information to the information processing apparatus 202, thereby logging in to the printing system. When the user selects print data to be printed, the transmitting unit 420 of the information processing apparatus 202 sends the printing apparatus 204 the authentication information, which has been input by the user 203, together with the selected print data.

Upon acquiring the print data, the printing apparatus 204 accesses the policy server 201 and acquires policy information. In accordance with this embodiment, the printing apparatus 204 stores access information, e.g., the address of the policy server 201, in the ROM 404 (storage unit) in advance. Accordingly, the policy information acquisition unit 413 reads the access information out of the ROM 404 and accesses the policy server 201. When the policy server 201 is accessed, the policy information acquisition unit 413 sends the policy server 201 the authentication information acquired from the information processing apparatus 202 and the ID that has been appended to the print data.

In a manner similar to that of the first embodiment, the policy server 201 sends the printing apparatus 204 the policy information from the authentication information and ID of which it has been notified. In accordance with the policy information, the printing apparatus 204 executes printing if printing is permitted and cancels printing if printing is not permitted.

Thus, as described above, the information processing apparatus according to this embodiment transmits authentication information to a printing apparatus together with print data. Further, the printing apparatus includes a storage unit in which access information is stored beforehand. As a result, the present printing system is such that it is possible to execute a policy check even with respect to print data from an information processing apparatus that does not store access information for the purpose of accessing a policy server. That is, even in a case where another terminal that does not store access information has been connected in the present printing system, a policy check can be executed, thereby enhancing security.

Third Embodiment

Figure 8:
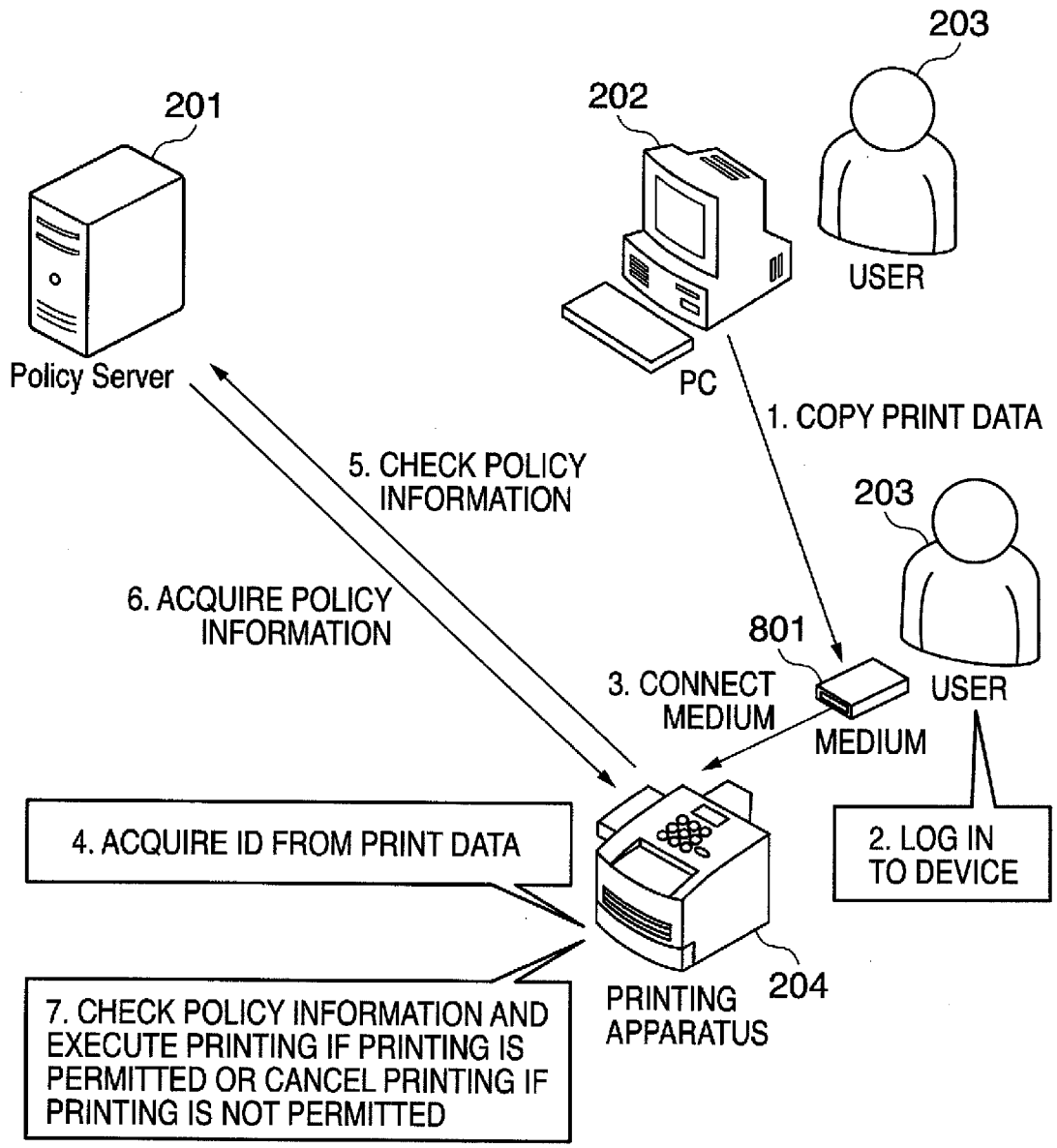
FIG. 8 is a diagram useful in describing an overview of a printing system corresponding to a third embodiment of the present invention.

Next, a third embodiment will be described with reference to FIGS. 8 and 9. The first and second embodiments have been described with regard to a printing system in which the information processing apparatus 202 transmits print data to the printing apparatus 204 via a communication network constituted by an information communication medium. The printing system according to this embodiment employs an information communication medium that is a removable storage medium to the printing apparatus. FIG. 8 is a diagram useful in describing an overview of a printing system corresponding to the third embodiment.

As illustrated in FIG. 8, the printing system according to the third embodiment includes the policy server 201, the information processing apparatus 202, the printing apparatus 204 and a removable medium (referred to simply as a "medium" below) such as a USB memory. In accordance with this embodiment, first the information processing apparatus 202 sends the medium 801 print data that is to be printed. Next, the printing apparatus 204 acquires authentication information that the user 203 has input in order to log in to the printing system. Here the printing apparatus 204 acquires authentication information that the user 203 has input from the panel 304. It is preferred that when the medium 801 is connected to the printing apparatus 204, the latter display a plurality of items of print data that have been stored in the medium 801 and the user 203 be allowed to select desired print data by the panel 304.

When print data is selected, the printing apparatus 204 determines whether an ID has been appended to the print data. If an ID has been appended, the printing apparatus 204 extracts the ID from the print data and executes a policy check. Here access information that has been stored beforehand in the ROM 404 is used in a manner similar to that of the second embodiment. If an ID has not been appended, on the other hand, then the printing apparatus 204 executes printing as is.

Figure 9:
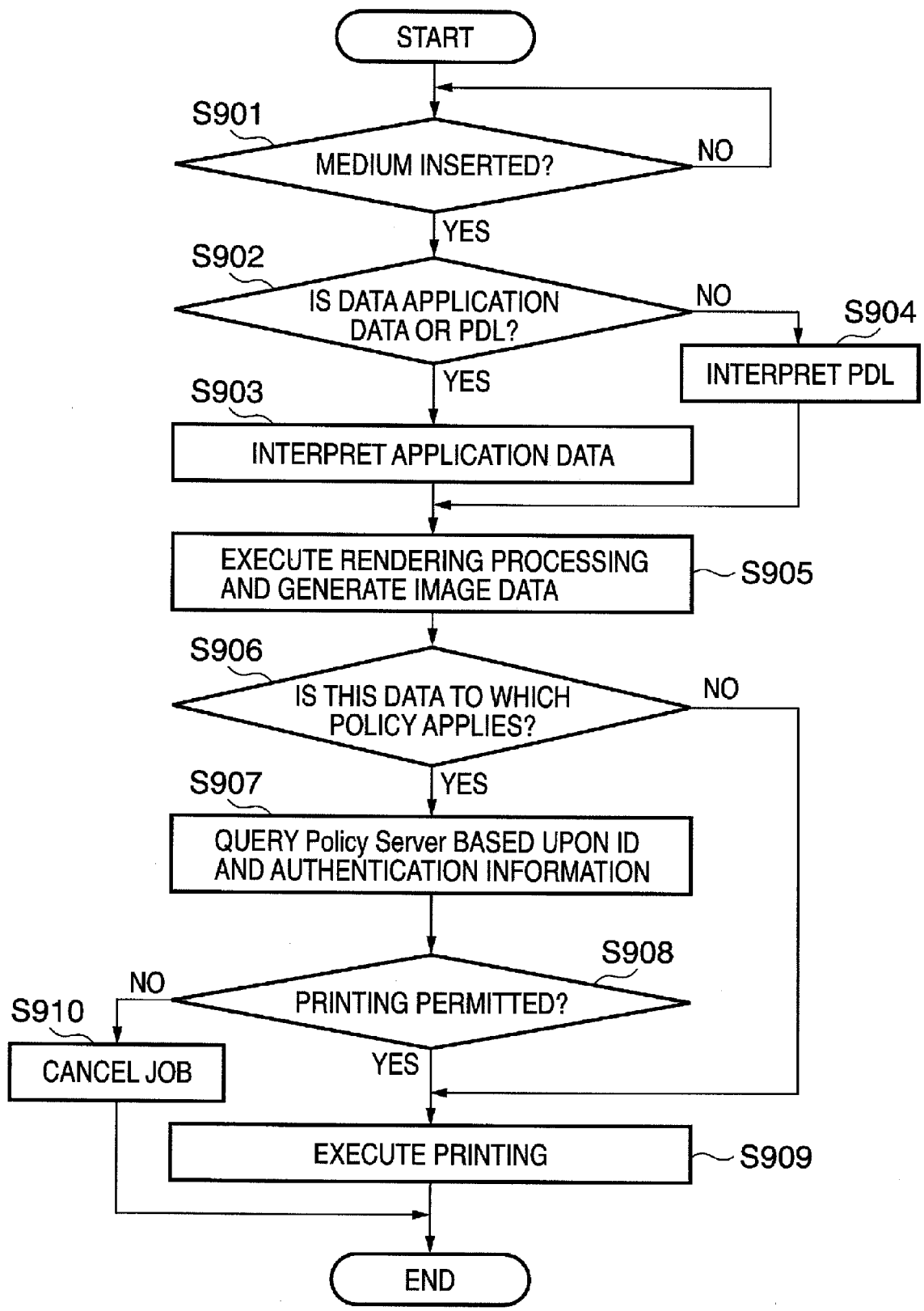
FIG. 9 is a flowchart illustrating processing executed by the printing apparatus corresponding to the third embodiment.

Next, reference will be had to FIG. 9 to describe processing executed by the printing apparatus 204 in this embodiment. FIG. 9 is a flowchart illustrating processing executed by the printing apparatus corresponding to the third embodiment.

At step S901, the CPU 409 determines whether the medium 801 has been inserted into the printing apparatus 204. Step S901 is executed repeatedly until it is determined that the medium 801 has been inserted. If the medium 801 is inserted, the CPU 409 determines at step S902 whether the data on the medium 801 is application data, such as PDF, or PDL data.

In case of application data, the CPU 409 interprets the application data at step S903. In case of PDL data, the CPU 409 interprets the PDL data at step S904. When the processing of step S903 or S904 ends, the CPU 409 executes rendering processing and generated image data at step S905.

Next, at step S906, the CPU 409 determines whether an ID has been appended to the acquired print data. If an ID has not been appended, control proceeds to step S909, where the CPU 409 executes printing. If an ID has been appended, on the other hand, the CPU 409 places on hold temporarily the image data for printing generated at step S905 and places execution of printing on hold at step S907. That is, the print job is placed on hold temporarily. Furthermore, the CPU 409 executes a policy check with respect to this print data. In accordance with access information that has been stored beforehand in the ROM 404, the CPU 409 accesses the policy server 201 and transmits the ID and authentication information. The policy information acquisition unit 413 then acquires policy information issued by the policy server 201.

Upon acquiring the policy information, the print determination unit 414 determines at step S908 whether the user 203 who commanded printing is permitted to print this print data. If printing has been permitted, the CPU 409 executes printing of the suspended print job at step S909. If printing has not been permitted, then the CPU 409 cancels the suspended print job at step S910.

Thus, as described above, the information communication medium according to this embodiment is a removable storage medium to a printing apparatus, and the medium stores print data to which an ID has been appended. The printing apparatus acquires print data that has been stored on the information communication medium. As a result, the present printing system is capable of executing a policy check even if printing is performed from a storage medium, such as a USB memory, connected directly to the printing apparatus 204. This results in a printing system of enhanced security.

Fourth Embodiment

Figure 10:
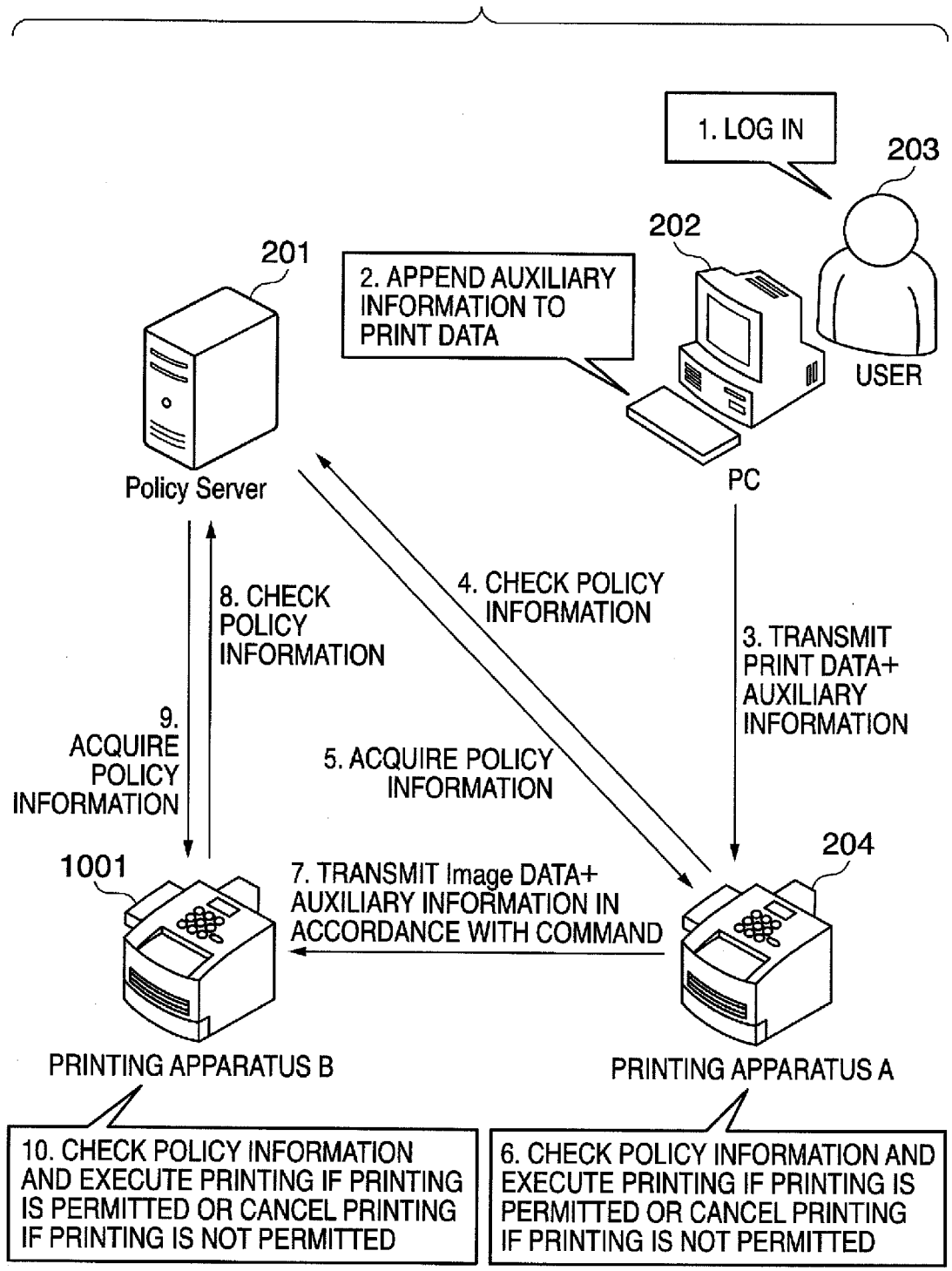
FIG. 10 is a diagram useful in describing an overview of a printing system corresponding to a fourth embodiment of the present invention.
Figure 11:
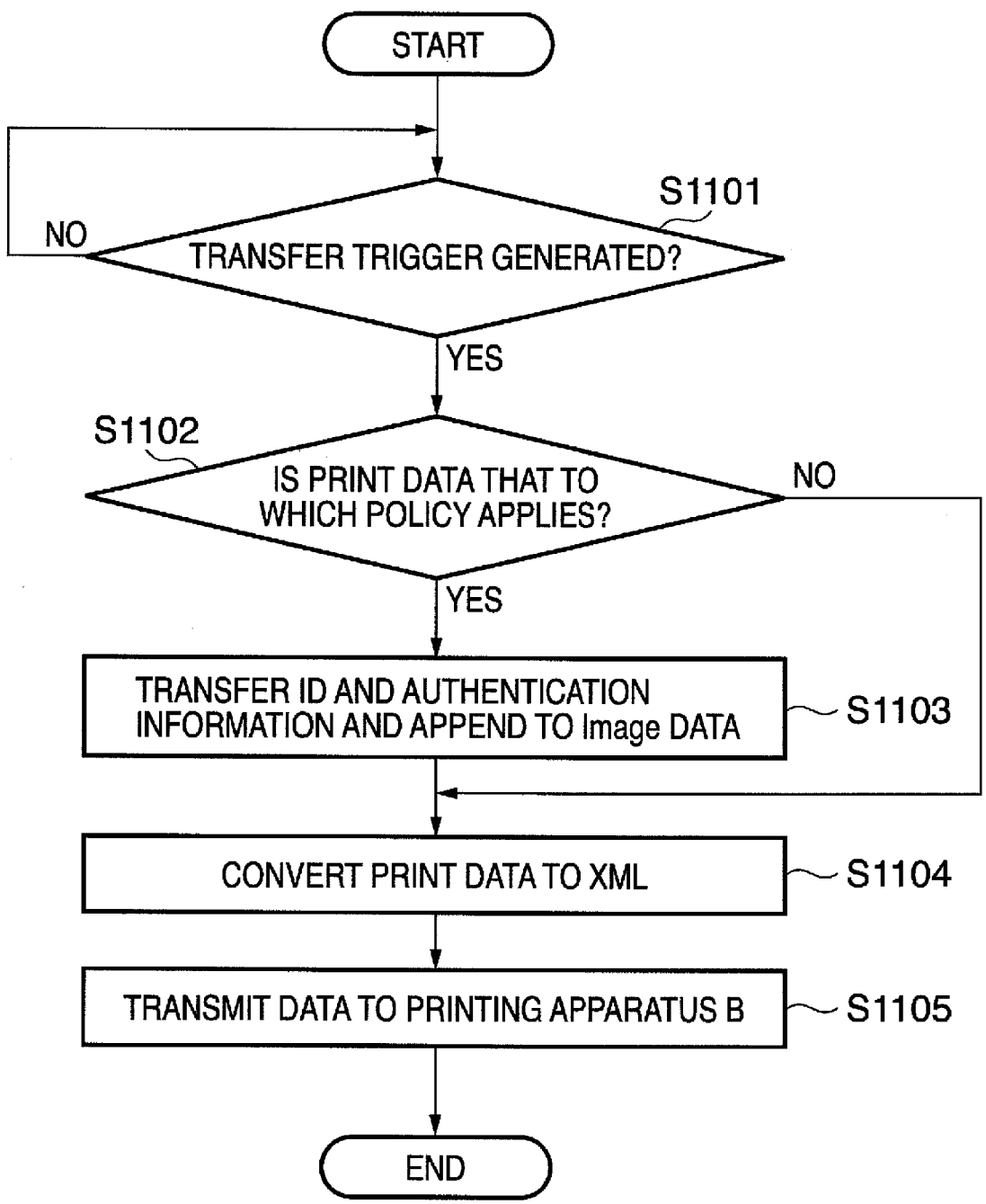
FIG. 11 is a flowchart illustrating transfer processing executed by the printing apparatus corresponding to the fourth embodiment.

Next, a fourth embodiment will be described with reference to FIGS. 10 and 11. The first and second embodiments have been described with regard to a printing system in which the information processing apparatus 202 transmits print data to the printing apparatus 204 via a communication network constituted by an information communication medium. The printing system according to this embodiment involves distributing printing or substitution printing. Distributed processing refers to processing in which a job for printing multiple copies initiated by the information processing apparatus 202 is printed by sharing the job among a plurality of printers. Substitution printing refers to processing in which a print job that a certain printer has received is not printed by this printer itself but is transferred to another printer which is then made to execute print processing instead. To accomplish this, the printing apparatus 204 transfers the print data to another printing apparatus. Furthermore, according to this embodiment, a policy check is executed for every printing apparatus to which print data has been transferred. FIG. 10 is a diagram useful in describing an overview of a printing system corresponding to the fourth embodiment.

As illustrated in FIG. 10, the printing system according to the fourth embodiment includes the policy server 201, the information processing apparatus 202, the printing apparatus 204 and a printing apparatus 1001. In accordance with this embodiment, first the user 203 input authentication information to the information processing apparatus 202 and logs in to the printing system. When print data to be printed is then selected by the user, the information processing apparatus 202 transmits access information and the authentication information to the printing apparatus 204 together with the print data.

Upon acquiring the print data, the printing apparatus 204 acquires policy information from the policy server 201 in accordance with the auxiliary information acquired. If the print job relating to the print data is cascade printing, the printing apparatus 204 transfers the image data corresponding to part of the print data as well as the auxiliary information to the other printing apparatus 1001, which is the apparatus to perform cascade printing. If the print job is substitution printing, the printing apparatus 204 transfers all of the print data and the auxiliary information. The printing apparatus 204 then executes printing in accordance with acquired policy information if a print job exists at the printing apparatus 204.

Further, when a print job is transferred to it from the printing apparatus 204, the printing apparatus 1001 first acquires policy information from the policy server 201 in accordance with the auxiliary information received. Then, in accordance with the policy information, the printing apparatus 1001 executes printing if printing has been permitted and cancels printing if printing has not been permitted.

Transfer processing executed by the printing apparatus 204 in this embodiment will now be described with reference to FIG. 11. FIG. 11 is a flowchart illustrating the transfer processing executed by the printing apparatus according to the fourth embodiment.

At step S1101, the transfer unit 415 determines whether a transfer trigger has been generated. If printing is cascade printing, then the transfer trigger is receipt of a print job for which cascade printing has been specified. If printing is substitution printing, then the transfer trigger is discriminated based upon an error in the printing apparatus 204, namely depletion of paper, a full load or paper jam, etc. If the transfer trigger has been generated, then the transfer unit 415 determines at step S1102 whether an ID has been appended to the print data. In case of print data to which an ID has been appended, i.e., print data for which a policy check is executed, control proceeds to step S1103. Here the transfer unit 415 appends the ID and authentication information to image data that has been generated from the print data. Then, at step S1104, the transfer unit 415 converts to XML the image data to which the ID and authentication information have been appended. On the other hand, in case of print data to which an ID has not been appended, i.e., print data for which a policy check is not executed, control proceeds to step S1104. Here the transfer unit 415 converts the image data to XML as is without appending the ID and authentication information. Then, at step S1105, the transfer unit 415 transfers the image data, which has been converted to XML, to the printing apparatus 1001. Upon receiving the transferred image data, ID and authentication information, the printing apparatus 1001 accesses the policy server 201, transmits the ID and authentication information and executes a policy check in a manner similar to that of the printing apparatus 204.

Thus, as described above, in a case where cascade (distributed) printing or substitution printing is carried out, the printing apparatus according to this embodiment transfers some or all of print data, which has been acquired via an information communication medium, to another printing apparatus. As a result, when cascade (distributed) printing or substitution printing is performed in the present printing system, auxiliary information, which is necessary for a policy check, also is transferred from one printing apparatus to another printing apparatus together with print data. Accordingly, the present printing system makes a policy check possible and enhances security also in the other printing apparatus.

Other Embodiments

Figure 12:
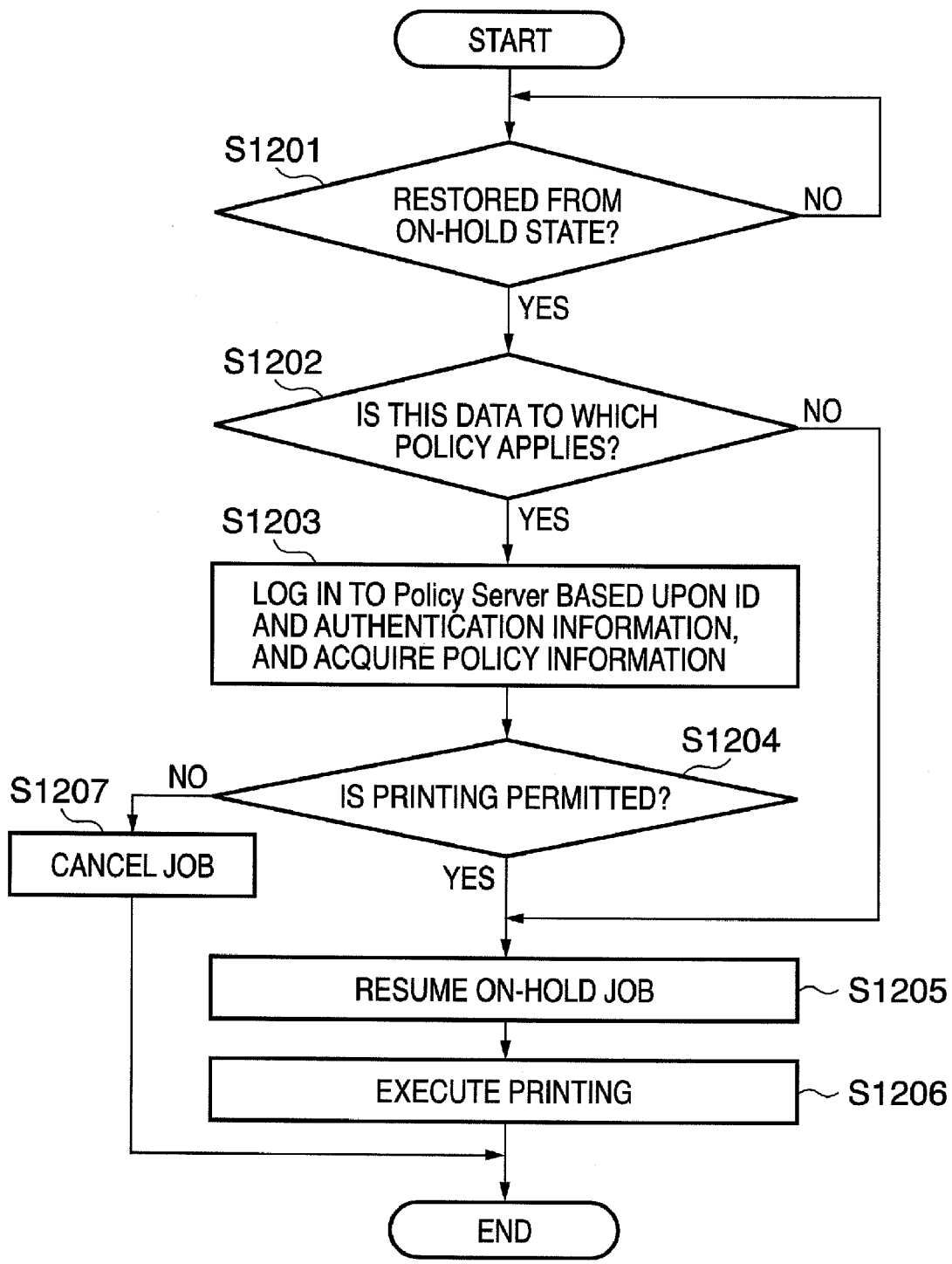
FIG. 12 is a flowchart illustrating processing executed by a printing apparatus corresponding to another embodiment of present invention.

The first to fourth embodiments assume that print data is received anew and printed. However, the present printing system is applicable also in case of execution of a print job in which once print data has been received, the print data is saved within the printing apparatus by a save-job command, and in a case where a job that has been halted (put on hold) because of depletion of paper is executed upon removal of the error. Processing by the printing apparatus 204 in another embodiment will be described with regard to portions thereof that differ from the first embodiment. FIG. 12 is a flowchart illustrating processing executed by a printing apparatus corresponding to another embodiment. Here a case where an error such as paper jam has occurred in the printing apparatus 204 will be described. It should be noted that the CPU 409 described below operates as an error processor.

First, at step S1201, the CPU 409 determines whether an error such as depletion of paper, a full load or paper jam has been removed. This step is repeated until the error is removed. If the error has been removed, the CPU 409 determined at step S1202 whether an ID has been appended to print data. If an ID has not been appended, control proceeds to step S1205 and the CPU 409 resumes the print job that was put on hold. The CPU 409 then executes printing at step S1206.

If an ID has been appended, on the other hand, then, at step S1203, the CPU 409 acquires policy information from the policy server 201 based upon authentication information and access information. If the result of the inquiry is that printing is permitted, then the CPU 409 resumes the print job that was put on hold and executes printing at steps S1205 and S1206, respectively. If printing is not permitted, control proceeds to step S1207 and the CPU 409 cancels the print job that was put on hold.

As a result, even in a case where a print job that has been put on hold temporarily is resumed, the present printing system is such that it is possible to execute printing in which policy information is reflected in real time by re-executing a policy check. This is effective since the latest policy information can be reflected at all times even in a case where policy information has been changed.

Although various embodiments have been described above in detail, the present invention may be applied to a system constituted by a plurality of devices or to an apparatus comprising a single device. For example, the invention may be applied to a printer, a facsimile machine, a personal computer or a computer system that includes a server and a client.

The present invention can also be attained by supplying a software program, which implements the functions of the foregoing embodiments, directly or remotely to a system or apparatus, reading the supplied program with a computer of the system or apparatus, and then executing the program.

Accordingly, since the functions and processing of the present invention are implemented by computer, the program codes per se installed in the computer also implement the present invention. In other words, a computer program per se that is for the purpose of implementing the foregoing functions and processing also is covered by the present invention.

In this case, so long as the system or apparatus has the functions of the program, the form of the program, e.g., object code, a program executed by an interpreter or script data supplied to an operating system, etc., does not matter.

Examples of recording media for supplying the program are a flexible disk, hard disk, optical disk, magneto-optical disk, CD-ROM, CD-R and CD-RW. Examples of storage media are magnetic tape, a non-volatile type memory card, ROM and DVD (DVD-ROM, DVD-R), etc.

Further, the program may be downloaded from a website on the Internet using a browser possessed by a client computer. That is, the website is accessed and the computer program per se of the present invention or an automatically installable compressed file is downloaded from the website. Further, the program of the present invention can be supplied by dividing the program code constituting the program into a plurality of files and downloading the files from different websites. In other words, there are cases where a WWW server that downloads, to multiple users, the program files that implement the functions and processes of the present invention by computer also is covered by the present invention.

Further, the program of the present invention may be encrypted, stored on a storage medium such as a CD-ROM and distributed to users. In this case, only users who meet certain requirements are allowed to download decryption key information from a website via the Internet, the encrypted program may be decrypted using the key information and then executed, and the program may be installed on a computer.

Further, the functions of the embodiments may be implemented by having a computer execute a program that has been read. In addition, an operating system or the like running on the computer may perform all or a part of the actual processing based upon the indications in the program. Of course, the functions of the embodiments can be implemented in this case as well.

Furthermore, it may be so arranged that a program that has been read from a recording medium is written to a memory provided on a function expansion board inserted into the computer or provided in a function expansion unit connected to the computer. A CPU or the like provided on the function expansion board or function expansion unit may perform some or all of the actual processing based upon the indications in the program. There are instances where the functions of the foregoing embodiments are implemented in this manner as well.

The present invention is capable of providing a printing system in which the latest policy information is reflected at all times and document-by-document policy information is checked.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-212240, filed on Aug. 3, 2006, which is hereby incorporated by reference herein in its entirety.

What is claimed is:

1. A printing system comprising:
   an information processing apparatus adapted to output print data to a printing apparatus;
   a policy server adapted to manage policy information that defines a restriction relating to the print data for each user; and
   a printing apparatus adapted to execute printing;
   wherein said information processing apparatus includes:
   an authentication information input unit adapted to input authentication information for authenticating a user; and
   a transmitting unit adapted to transmit the print data and the authentication information to said printing apparatus, the print data having identification information that is necessary for said policy server to identify the print data;
   wherein said printing apparatus includes:

a first acquisition unit adapted to acquire the print data and the authentication information from said information processing apparatus;

a second acquisition unit adapted to transmit the authentication information and the identification information to said policy server, and acquire the policy information corresponding to the user from said policy server; and a first determination unit adapted to determine whether or not to execute printing of the print data in accordance with the acquired policy information; and said policy server includes an issuing unit adapted to issue the policy information corresponding to the user, based upon the authentication information and the identification information.

2. The system according to claim 1, wherein said information processing apparatus further comprises:

a second determination unit adapted to determine whether or not identification information has been appended to print data, wherein the identification information is necessary for said policy server to identify the print data; and if said second determination unit determines that the identification information has been appended to the print data, said transmitting unit transmits the print data and the authentication information to said printing apparatus, and if said second determination unit determines that the identification information has not been appended to the print data, said transmitting unit transmits the print data to said printing apparatus.

3. The system according to claim 1, wherein said transmitting unit is further adapted to transmit the print data and the authentication information to a removable storage medium; and said first acquisition unit is further adapted to acquire the print data and the authentication information from said removable storage medium.

4. The system according to claim 1, wherein in a case where said printing apparatus performs distributed printing or substitution printing, said printing apparatus further includes a transfer unit adapted to transfer some or all of print data identification information and the authentication information to another printing apparatus.

5. The system according to claim 1, wherein said printing apparatus further includes:

a third acquisition unit adapted to acquire command information, which indicates how the print data will be handled, in a case where said first determination unit has determined that printing is not executed; and a processing unit adapted to process the print data in accordance with the command information.

6. The system according to claim 1, wherein said printing apparatus includes an error processing unit which, in a case where printing of a print job relating to the print data for which execution of printing has been determined by said first determination unit has been halted due to an error in said printing apparatus, is adapted to allow the policy information to be acquired again by said second acquisition unit after the error is removed and to allow the determination by said first determination unit as to whether or not to execute printing.

7. The system according to claim 1, wherein the restriction signifies rights to perform an operation.

8. The apparatus according to claim 7, further comprising:

an identification information determination unit adapted to determine whether or not print data acquired by said first acquisition unit has identification information which is necessary for the policy server to identify the print data.

9. A printing system comprising:

an information processing apparatus adapted to output print data;

a policy server adapted to manage policy information that defines at least a printing restriction among restrictions on functions relating to the print data; and a printing apparatus;

wherein said information processing apparatus includes an output unit adapted to output the print data, the print data having an appended identification information necessary in order to identify the print data;

wherein said printing apparatus includes:

a first acquisition unit adapted to acquire the print data via an information communication medium;

a second acquisition unit adapted to acquire the policy information by accessing said policy server based upon access information for accessing said policy server, and transmitting authentication information , which is for authenticating the user of the print data, and the identification information to said policy server; and a first determination unit adapted to determine whether or not to execute printing in accordance with the acquired policy information; and said policy server includes an issuing unit adapted to issue the policy information based upon the authentication information and the identification information;

wherein said information processing apparatus further comprises:

an authentication information input unit adapted to input the authentication information;

a second determination unit adapted to determine whether the identification information has been appended to the print data; and a transmitting unit adapted to transmit the authentication information to the printing apparatus together with the print data in a case where the identification information has been appended;

wherein said printing apparatus further includes:

a storage unit adapted to store the access information in advance; and a receiving unit adapted to receive the authentication information together with print data to which the identification information has been appended; and said second acquisition unit acquires the policy information by logging in to said policy server based upon the access information that has been stored in said storage unit and transmitting the authentication information and the identification information received by said receiving unit to said policy server.

10. A printing system comprising:

an information processing apparatus adapted to output print data;

a policy server adapted to manage policy information that defines at least a printing restriction among restrictions on functions relating to the print data; and a printing apparatus;

wherein said information processing apparatus includes an output unit adapted to output the print data, the print data having an appended identification information necessary in order to identify the print data;

wherein said printing apparatus includes:

a first acquisition unit adapted to acquire the print data via an information communication medium;

a second acquisition unit adapted to acquire the policy information by accessing said policy server based upon access information for accessing said policy server, and transmitting authentication information , which is for authenticating the user of the print data, and the identification information to said policy server; and a first determination unit adapted to determine whether or not to execute printing in accordance with the acquired policy information; and said policy server includes an issuing unit adapted to issue the policy information based upon the authentication information and the identification information;

wherein said printing apparatus further includes:

a third acquisition unit adapted to acquire command information, which indicates how the print data will be handled, in a case where said first determination unit has determined that printing is not executed; and a processing unit adapted to process the print data in accordance with the command information; and wherein said third acquisition unit is capable of selecting, as the command information, any of job cancellation for canceling printing, allocation printing for allocating pages and title printing for printing titles only, and notifies the user of the selected information.

11. An information processing apparatus comprising:

an authentication information input unit adapted to input authentication information for authenticating a user;

a determination unit adapted to determine whether or not identification information has been appended to print data, wherein a policy server manages policy information that defines a restriction relating to print data for each user and the identification information is necessary for the policy server in order to identify the print data; and a transmitting unit adapted to transmit the print data and the authentication information to a printing apparatus in a case where the identification information has been appended to the print data.

12. A printing apparatus comprising;

a first acquisition unit adapted to acquire print data and authentication information for authenticating a user from an information processing apparatus, wherein a policy server manages policy information that defines a restriction relating to the print data for each user and the print data have identification information that is necessary for the policy server in order to identify print data;

a second acquisition unit adapted to transmit the authentication information and the identification information to the policy server, and acquire the policy information corresponding to the user; and a determination unit adapted to determine whether or not to execute printing of the print data in accordance with the acquired policy information.

13. The apparatus according to claim 12, wherein the restriction signifies rights to perform an operation.

14. The apparatus according to claim 12, if said first acquisition unit acquires print data having no identification information which is necessary for the policy server to identify the print data from the information processing apparatus, the printing apparatus executes printing of the print data without acquiring the policy information from the policy server.

15. The apparatus according to claim 12, wherein said first acquisition unit acquires the print data, the authentication information and an address of the policy server from the information processing apparatus, and said second acquisition unit transmits the authentication information and the identification information to the policy server based upon the address of the policy server.

16. A method of controlling an information processing apparatus comprising the steps of;

inputting authentication information for authenticating a user;

determining whether or not identification information has been appended to print data, wherein a policy server manages policy information that defines a restriction relating to print data for each user and the identification information is necessary for the policy server in order to identify the print data; and in a case where the identification information has been appended to the print data, transmitting the print data and the authentication information to a printing apparatus.

17. A method of controlling a printing apparatus comprising steps of:

acquiring print data and authentication information for authenticating a user from an information processing apparatus, wherein a policy server manages policy information that defines a restriction relating to the print data for each user and the print data have identification information that is necessary for the policy server in order to identify print data;

transmitting the authentication information and the identification information to the policy server;

acquiring the policy information corresponding to the user; and determining whether or not to execute printing of the print data in accordance with the acquired policy information.

18. A computer readable storage medium storing a computer program for causing a computer to execute a method of controlling an information processing apparatus, comprising the steps of:

inputting authentication information for authenticating a user;

determining whether or not identification information has been appended to print data, wherein a policy server manages policy information that defines a restriction relating to print data for each user and the identification information is necessary for the policy server in order to identify the print data; and in a case where the identification information has been appended to the print data, transmitting the print data and the authentication information to a printing apparatus.

19. A computer readable storage medium storing a computer program for causing a computer to execute a method of controlling a printing apparatus, comprising the steps of:

acquiring print data and authentication information for authenticating a user from an information processing apparatus, wherein a policy server manages policy information that defines a restriction relating to the print data for each user and the print have identification information that is necessary for the policy server in order to identify print data;

transmitting the authentication information and the identification information to the policy server;

acquiring the policy information corresponding to the user; and determining whether or not to execute printing of the print data in accordance with the acquired policy information.

* * * * *